(12) United States Patent
Dillon et al.

(10) Patent No.: US 10,917,178 B2
(45) Date of Patent: Feb. 9, 2021

(54) FREQUENCY AGILE MICROWAVE RADIOMETER, HYPERSPECTRAL MICROWAVE RADIOMETER AND METHODS OF OPERATION

(71) Applicant: PHASE SENSITIVE INNOVATIONS, INC., Newark, DE (US)

(72) Inventors: Tom Dillon, Newark, DE (US); Christopher Schuetz, Avondale, PA (US); Dennis Prather, New Castle, DE (US)

(73) Assignee: Phase Sensitive Innovations, Inc., Newark, DE (US)

( * ) Notice: Subject to any disclaimer, the term of this patent is extended or adjusted under 35 U.S.C. 154(b) by 0 days.

(21) Appl. No.: 16/365,568

(22) Filed: Mar. 26, 2019

(65) Prior Publication Data

US 2019/0296831 A1    Sep. 26, 2019

Related U.S. Application Data

(60) Provisional application No. 62/648,095, filed on Mar. 26, 2018.

(51) Int. Cl.
*H04B 10/61* (2013.01)
*H04B 10/64* (2013.01)
(Continued)

(52) U.S. Cl.
CPC ....... *H04B 10/614* (2013.01); *H04B 10/5165* (2013.01); *H04B 10/615* (2013.01);
(Continued)

(58) Field of Classification Search
CPC .......... H04B 10/614; H04B 10/5165; H04B 10/615; H04B 10/64; H04B 10/675;
(Continued)

(56) References Cited

U.S. PATENT DOCUMENTS 5,086,300 A * 2/1992 Ashmore ............... G01V 3/12
342/20
5,526,158 A * 6/1996 Lembo ............... H04B 10/588
398/183

(Continued)

OTHER PUBLICATIONS

Schneider et al., "Radiofrequency signal-generation system with over seven octaves of continuous tuning," Nature Photonics, published online Jan. 20, 2013 (www.nature.com/naturephotonics) pp. 1-5.

*Primary Examiner* — Abbas H Alagheband

(74) *Attorney, Agent, or Firm* — Muir Patent Law, PLLC

(57) ABSTRACT

A hyperspectral radiometer may comprise one or more antennas, a electro-optical modulator modulating the received RF signal onto an optical carrier to generate a modulated signal having at least one sideband; a filter filtering the modulated signal to pass the sideband to a photodetector; and a photodetector producing an electrical signal from which information of the RF signal can be extracted. In some examples, the optical sideband may be spatially dispersed to provide a plurality of spatially separate optical components to the photodetector, where the spatially separate optical components having different frequencies and correspond to different frequencies of the received RF signal. In some examples, the passed sideband may be mixed with an optical beam having a frequency offset from the optical carrier to form a combined beam having at least one optical signal component having a beat frequency from which information of the RF signal can be extracted.

27 Claims, 8 Drawing Sheets

(51) Int. Cl.
*H04B 10/516* (2013.01)
*H04B 10/67* (2013.01)

(52) U.S. Cl.
CPC ........... *H04B 10/64* (2013.01); *H04B 10/675* (2013.01); *H04B 2210/006* (2013.01)

(58) Field of Classification Search
CPC .. H04B 2210/006; H04B 10/676; H04B 1/40; H04B 10/142; H04B 10/588; H04B 10/00; G01J 3/18; G01J 3/0229; G01J 3/0221; G01J 3/4338; G01J 3/14; G01J 3/2823
USPC ........................................................ 398/208
See application file for complete search history.

(56) References Cited

U.S. PATENT DOCUMENTS

| | | | | |
|---|---|---|---|---|
| 5,793,049 A * | 8/1998 | Ballard | ................. | G01J 3/2823 250/458.1 |
| 6,285,493 B1 * | 9/2001 | Carrott | ................. | G02F 1/11 359/305 |
| 6,462,877 B1 * | 10/2002 | Hait | ................. | H04B 10/50 359/583 |
| 6,762,713 B1 * | 7/2004 | McMillan | ................. | G01S 7/024 342/188 |
| 7,835,002 B2 * | 11/2010 | Muhammed | ................. | G01J 3/02 250/226 |
| 7,974,534 B2 * | 7/2011 | Weiner | ................. | H04B 1/40 398/85 |
| 8,026,837 B1 * | 9/2011 | Valley | ................. | H04B 10/676 341/137 |
| 8,159,737 B2 * | 4/2012 | Martin | ................. | G01S 13/89 359/239 |
| 8,331,008 B1 * | 12/2012 | Matsko | ................. | G02B 6/29341 359/247 |
| 8,417,076 B2 * | 4/2013 | Maleki | ................. | G02F 2/02 359/239 |
| 8,514,400 B2 * | 8/2013 | Mohageg | ................. | G01C 19/72 356/459 |
| 8,538,270 B2 * | 9/2013 | Seidel | ................. | G02F 2/002 372/21 |
| 8,848,752 B2 | 9/2014 | Prather et al. | | |
| 9,097,800 B1 * | 8/2015 | Zhu | ................. | G01S 13/865 |
| 9,413,372 B1 * | 8/2016 | Valley | ................. | G02F 7/00 |
| 9,525,489 B2 * | 12/2016 | Schuetz | ................. | H01Q 3/2676 |
| 9,614,280 B2 * | 4/2017 | Shi | ................. | H01Q 3/2676 |
| 9,698,911 B2 * | 7/2017 | Schaefer | ................. | H04B 10/564 |
| 10,345,631 B1 * | 7/2019 | Partee | ................. | G02F 1/092 |
| 10,404,403 B2 * | 9/2019 | Troeltzsch | ................. | H04J 14/0208 |
| 2003/0020897 A1 * | 1/2003 | Griffiths | ................. | G01J 1/42 356/73 |
| 2003/0142320 A1 * | 7/2003 | Mells | ................. | G01J 9/04 356/484 |
| 2008/0123097 A1 * | 5/2008 | Muhammed | ................. | G01J 3/02 356/419 |
| 2009/0297155 A1 * | 12/2009 | Weiner | ................. | H04B 1/40 398/115 |
| 2011/0150485 A1 * | 6/2011 | Seidel | ................. | H03D 9/00 398/115 |
| 2012/0195590 A1 * | 8/2012 | Eliyahu | ................. | G01R 29/26 398/26 |
| 2014/0270783 A1 * | 9/2014 | Prather | ................. | H04B 10/25752 398/115 |
| 2017/0222721 A1 * | 8/2017 | Dailey | ................. | H04B 10/25752 |
| 2017/0284867 A1 * | 10/2017 | Gensemer | ................. | G06T 9/00 |
| 2018/0198608 A1 * | 7/2018 | Nordholt | ................. | H04B 10/70 |
| 2019/0097722 A1 * | 3/2019 | McLaurin | ................. | H01S 5/34333 |

* cited by examiner ately ~~~ on to an optical carrier to generate a modulated signal having at least one sideband; filtering the modulated signal to pass the sideband to a photodetector; and extracting information of the RF signal received by the antenna from an electrical signal generated by the photodetector. The method may comprise spatially dispersing the passed sideband to provide a plurality of spatially separate optical components to the photodetector, the spatially separate optical components having different frequencies. The method may comprise mixing the passed sideband with an optical beam having a frequency offset from the optical carrier to form a combined beam having at least one optical signal component having a beat frequency.

FREQUENCY AGILE MICROWAVE RADIOMETER, HYPERSPECTRAL MICROWAVE RADIOMETER AND METHODS OF OPERATION

CROSS-REFERENCE TO RELATED APPLICATION

This application claims priority to Provisional Patent Application No. 62/648,095, the contents of which are hereby incorporated by reference in their entirety.

STATEMENT REGARDING FEDERALLY SPONSORED RESEARCH OR DEVELOPMENT

This invention was made with government support under Contract No. 80NSSC18P2017 awarded by the National Aeronautics and Space Administration (NASA). The government has certain rights in the invention.

BACKGROUND

Passive microwave remote sensing is currently utilized by NASA, NOAA, ESA and others to conduct Earth Science missions, including weather forecasting, early warning systems, and climate studies. Humidity and temperature sounding is conducted near several absorption lines to determine key parameters of the atmospheric state, including moisture content, temperature profile, and barometric pressure. Using neural networks, these parameters are retrieved from raw sensor data at a small number of discreet frequencies. To improve retrieval accuracy as well as predictive ability of weather models, measurements at a large number of closely spaced frequencies, i.e. hyperspectral sensing, should be implemented. A hyperspectral radiometer would also be helpful for the study of atmospheric composition and dynamics on other celestial bodies such as Jupiter or Titan, as well as other applications, such as for use in RF interference mitigation and sensor calibration.

Microwave/millimeter-wave radiometry has demonstrated tremendous utility in space-based meteorological data-gathering for many decades. Current efforts in microwave sensing encompass a wide frequency range of operation—from sounders operating in the low MHz range to millimeter-wave (mmW) radiometers and radars operating in the hundreds of GHz range. The atmospheric transmission of infrared and microwave RF frequencies in the GHz range (e.g., from 300 MHz-500 GHz and beyond) are often of interest. Within this spectrum, there exist several distinct absorption lines where microwave sounders are typically deployed. The transmission, or the related sky brightness temperature, near these absorption lines is a strong function of atmospheric conditions, such as moisture. Much can be discerned about the atmosphere, ground cover, and ocean surface by monitoring these signals. The raw sensor data is collected at a number of discrete frequencies from which many useful data products are retrieved, commonly using neural networks. Besides the atmospheric temperature and moisture profile, additional data products include precipitation rate, land surface emissivity, snow cover, sea ice concentration, land surface temperature, cloud liquid water, and more. These data products are provided to the National Weather Service for weather forecasting, as well as to the larger scientific community.

However, radiometers systems are often bulky and limited to detecting a narrow range of frequencies. Resolution and power requirements may also make current systems impractical and/or less than optimal for many implementations.

SUMMARY

Exemplary embodiments provide a radiometer and hyperspectral sensing methods to process RF signals received by one or more antenna elements.

According to aspects of various embodiments, a method of RF signal processing comprises receiving an incoming RF signal at an antenna; modulating the received RF signal onto an optical carrier to generate a modulated signal having at least one sideband; filtering the modulated signal to pass the sideband to a photodetector; and extracting information of the RF signal received by the antenna from an electrical signal generated by the photodetector. The method may comprise spatially dispersing the passed sideband to provide a plurality of spatially separate optical components to the photodetector, the spatially separate optical components having different frequencies. The method may comprise mixing the passed sideband with an optical beam having a frequency offset from the optical carrier to form a combined beam having at least one optical signal component having a beat frequency.

According to aspects of the various embodiments, a hyperspectral radiometer may be implemented and configured to perform one or more of such operations.

BRIEF DESCRIPTION OF THE DRAWINGS

The present disclosure now will be described more fully with reference to the accompanying drawings, in which various embodiments are shown.

DETAILED DESCRIPTION OF THE EMBODIMENTS

Figure 1:
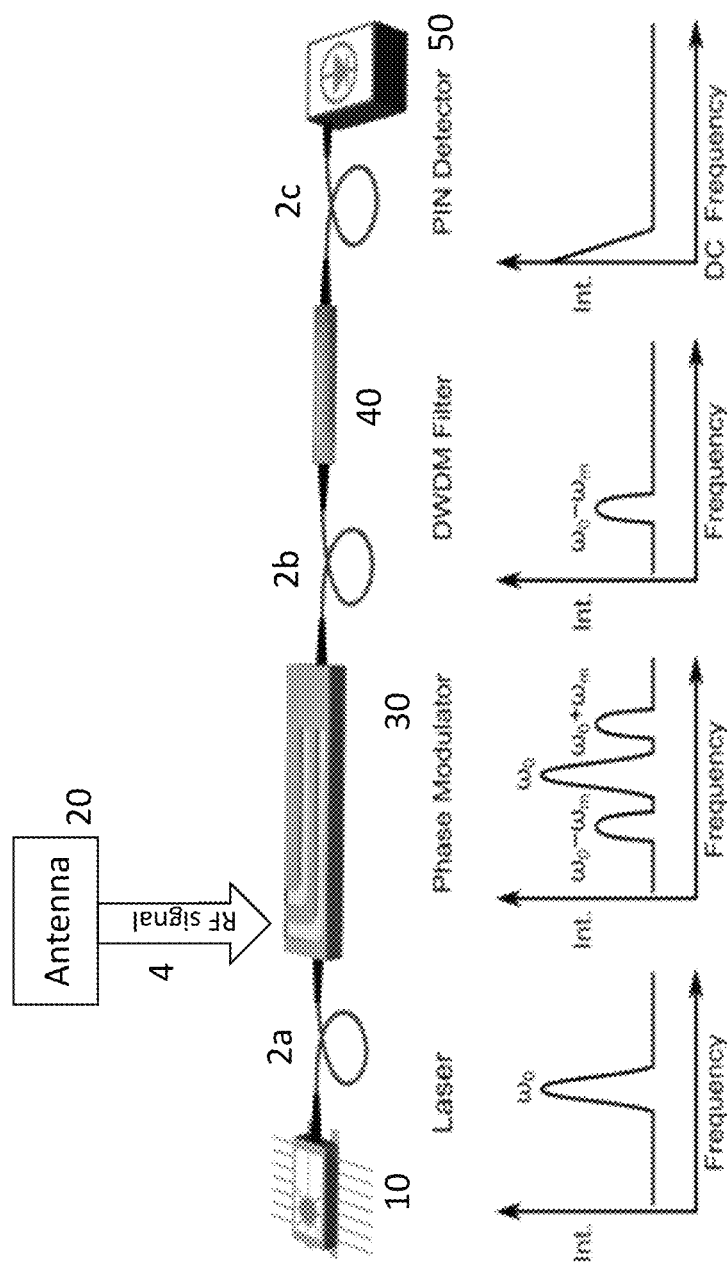
FIG. 1 is a block diagram of an exemplary radiometer in accordance with aspects of the invention.

The present disclosure now will be described more fully hereinafter with reference to the accompanying drawings, in which various exemplary embodiments are shown. The invention may, however, be embodied in many different forms and should not be construed as limited to the exemplary embodiments set forth herein. These example exemplary embodiments are just that—examples—and many embodiments and variations are possible that do not require the details provided herein. It should also be emphasized that the disclosure provides details of alternative examples, but such listing of alternatives is not exhaustive. Furthermore, any consistency of detail between various exemplary embodiments should not be interpreted as requiring such detail—it is impracticable to list every possible variation for every feature described herein. The language of the claims should be referenced in determining the requirements of the invention.

Ordinal numbers such as "first," "second," "third," etc. may be used simply as labels of certain elements, steps, etc., to distinguish such elements, steps, etc. from one another. Terms that are not described using "first," "second," etc., in the specification, may still be referred to as "first" or "second" in a claim. In addition, a term that is referenced with a particular ordinal number (e.g., "first" in a particular claim) may be described elsewhere with a different ordinal number (e.g., "second" in the specification or another claim). As used herein, the term "and/or" includes any and all combinations of one or more of the associated listed items.

It will be understood that when an element is referred to as being "connected" or "coupled" to or "on" another element, it can be directly connected or coupled to or on the other element or intervening elements may be present. In contrast, when an element is referred to as being "directly connected" or "directly coupled" to another element, or as "contacting" or "in contact with" another element, there are no intervening elements present.

The terminology used herein is for the purpose of describing particular embodiments and is not intended to be limiting of the inventive concept disclosure and claims. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings. The same reference numerals will be used to refer to the same elements throughout the drawings and detailed description about the same elements may be omitted in order to avoid redundancy.

Aspects of the embodiments provide a signal detection mechanism wherein RF signals received by one or more antennas are upconverted by fiber-coupled optical phase modulators driven by the antenna element(s). The conversion results in sidebands on an optical carrier wave supplied by a laser. These optical sidebands are substantially proportional in power to the RF power incident into the antenna element(s), and also preserve the phase carried by the incident RF signals. The optical sidebands can be used to analyze the RF energy received by the antenna(s).

FIG. 1 illustrates an exemplary embodiment of a radiometer. An incoming RF signal is provided by antenna 20 via an RF waveguide 4 to electro-optical modulator 30 (also referenced herein as an EO modulator). The incoming RF signal may be of any frequency band of interest and the antenna may be optimized to capture an electromagnetic wave of such frequencies (e.g., radiating arm(s) of the antenna may have a length of one half of the wavelength of within the RF frequency band of the operational frequency of the antenna 20). The RF signal may be transmitted from the antenna 20 by RF waveguide 4 to electro-optical modulator 30. Optionally, an amplifier (not shown in FIG. 1) may be provided between the antenna 20 and the electro-optical modulator 30 to amplify the RF signal output by the antenna 20 and transmit the same to the phase modulator 30. In some examples, the EO modulator 30 and waveguide 4 may be provided on a semiconductor chip. When plural EO modulators 30 are used (as described elsewhere herein), plural EO modulators 30 and plural RF waveguides 4 may be provide with the same chip. The on chip RF waveguide(s) 4 may be coplanar waveguide(s) (CPW). The electro-optical modulator 30 receives the RF signal and modulates an optical carrier provided by laser 10 (e.g., a laser beam of frequency $\omega_0$) on optical fiber 2a to generate sidebands (at $(\omega_0-\omega_m)$ and $(\omega_0+\omega_m)$) that preserve the signal amplitude and phase of the RF signal. The electro-optical modulator 30 may be considered a mixer and be implemented with a phase modulator that modulates the phase of the optical carrier provided by laser 10 in response to the received RF signal. The received RF signal is thus upconverted into the optical domain. The RF signal received in the RF domain appears in the optical domain (in the optical signal output by the EO modulator 30) as sidebands of the optical carrier frequency of optical carrier of the laser 10. This up-conversion of the RF signal into optical domain is coherent in the sense that all the phase and amplitude information present in RF is preserved in the optical sidebands. This property of coherence preservation in optical up-conversion allows the recovery of the RF signals and/or information thereof (such as power) using optical means as described herein.

In some examples, the electro-optical modulator 30 may be a lithium niobate modulator. An optical filter 40 receives the modulated optical carrier on optical fiber 2b and filters the same to pass one of the sidebands on to a photodetector (blocking the optical carrier and other sideband). The filter 40 may be a conventional DWDM (dense wavelength-divisional multiplexing) filter. The passed sideband is received by a photodetector 50 (e.g., a photodiode, such as a PIN photodiode) on optical fiber 2c. Photodetector 50 generates a photocurrent proportional to the incident optical power received from the passed sideband. Thus, the radiometer acts as a microwave power meter, producing an output signal proportional to the input power.

The filter 40 may be a passband filter to narrow the bandwidth a particular detection frequency and thus detect the microwave power of a desired frequency. In some examples, the passband filter is tunable to achieve a frequency-agile receiver/radiometer in which received power of a selected frequency or a selected frequency band (within the larger operational frequency bandwidth of the antennal and/or radiometer) may be measured. The detection bandwidth may be limited by the ability to couple the RF signal to the EO modulator; in practice, the antenna or amplifier inserted between the modulator and antenna (not shown in FIG. 1) would restrict the bandwidth. However, use of such an amplifier is optional and may be used depending on design implementations. In addition, multiple frequency bands may be measured with a single back-end by channelizing the receiver and/or cascading the modulators. Thus, the use of the ultra-wideband EO modulators may realize spectral coverage in a wide range, e.g., 20 to 300 GHz or more, in both millimeter and microwave frequencies, etc. The use of fiber optics offers low loss, dispersion free routing of signals with optical fiber waveguides (e.g., 2a, 2b and 2c)

that are much less heavy and bulky as compared to metal waveguides. Furthermore, the upconversion of the RF signal by the EO modulator 30 preserves both amplitude and phase of signal, which enables coherent detection. In some examples, an imager employing aperture syntheses is formed from a coherent array of these receiver elements.

Figure 2:
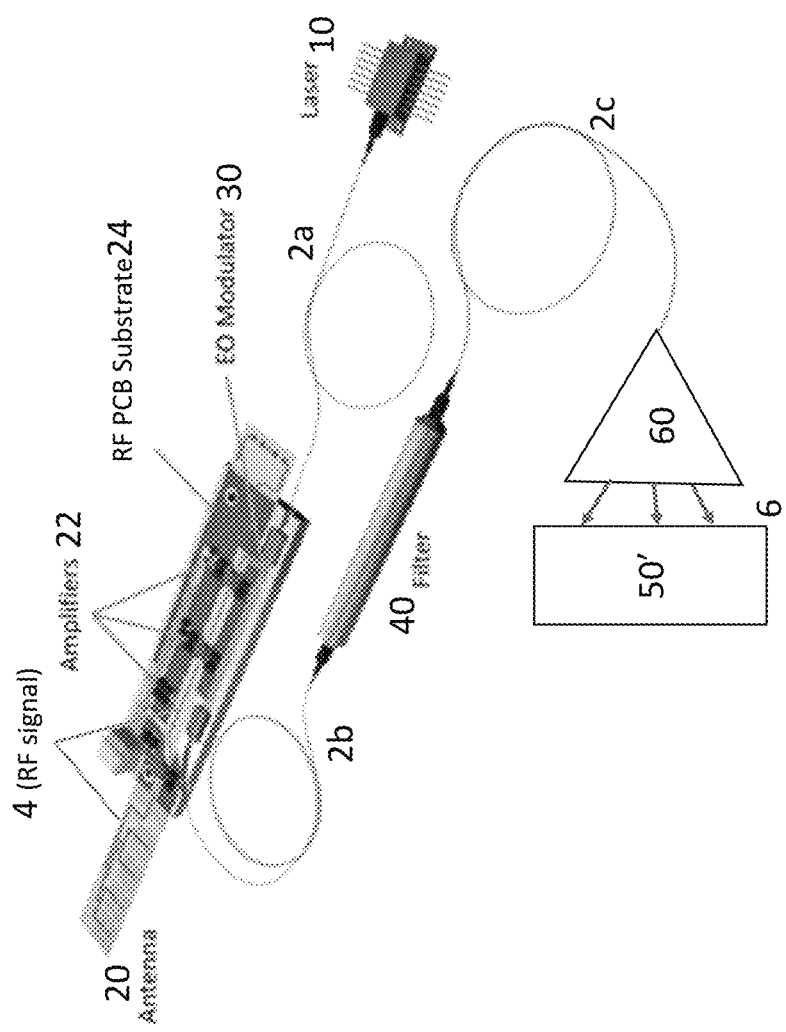
FIG. 2 is a block diagram of an exemplary hyperspectral radiometer in accordance with aspects of the invention.

FIG. 2 illustrates an example of a hyperspectral radiometer according some embodiments. In the example of FIG. 2, the hyperspectral radiometer is formed as a microwave spectrograph.

Use of same or similar reference numerals refer to same structure described elsewhere herein and repetitive description may be omitted. In the example illustrated in FIG. 2, the hyperspectral radiometer includes laser 10, antenna 20, EO modulator 30, filter 40 and optical fibers 2a, 2b and 2c, connected and functioning as described with respect to FIG. 1. The hyperspectral radiometer of FIG. 2 shows use of amplifiers 22 to amplify the RF signal provided by antenna 20, with RF waveguides 4 providing RF signal connections between the antenna 20, the amplifiers 22 and the EO modulator 30. The antenna 20, the amplifiers 22 and the EO modulator 30 may be formed on a printed circuit board (RF PCB substrate 24), such as being fabricated by patterning a liquid crystal polymer material layer of the RF PCB substrate using standard PCB manufacturing techniques. Other active components, such as low noise amplifiers and other passive components, such as RF signal splitters and combiners, may also be formed from the RF PCB substrate 24.

As discussed with respect to FIG. 1, filter 40 may pass one of the optical sidebands generated by the EO modulator 30 and transmit the same on optical fiber 2c. As shown in FIG. 2, the sideband transmitted by optical fiber 2c is input into an optical dispersion element 60. Optical dispersion element 60 divides the light of the received sideband according to wavelength of the component elements forming the sideband. For example, the optical dispersion element 60 may a prism, a diffraction grating, a spatial light modulator, an arrayed waveguide grating (AWG), a plurality of these elements and/or a combination of some or all thereof. The output of the optical dispersion element 60 is the received optical sideband having its optical frequency (and corresponding optical wavelength) components spatially separated. The spatially separated frequency components may be transmitted to detector 50' through any suitable optically transmissive medium, such as free space, lenses, etc. Detector 50' may be an array of photodetectors and may be embodied as a 1D array of photodetectors or as a 2D array, such as a conventional image sensor of a camera formed from a plurality of rows and columns of pixels (each pixel comprising a photodetector, such as a photodiode configured to sense the intensity of light impinged thereon). As detector 50' receives the frequency components of the optical sideband, the detector 50 may determine the corresponding intensities of each of the frequency components of the optical sideband, such as by providing pixel intensity data. For example, if detector 50' comprises 1000 columns of pixels, the average pixel intensity of each column may correlate to and represent the intensity of a corresponding frequency of the optical sideband, which in turn, may represent the corresponding energy of a particular frequency of the RF signal received by the antenna 20. Of course, rows of pixels may be used rather than columns or other groupings of pixels dependent upon the dispersion of the optical sideband provided by the dispersion element 60.

Thus, the hyperspectral radiometer may simultaneously detect the intensities of the different frequencies of the RF signal received by the antenna 20 in real time. It will be appreciated that reference to different frequencies here in actuality encompasses a range of frequencies within a relatively very narrow band. Using an optical carrier of 1550 nm from laser 10, a 1 GHz resolution requires a resolving power of ~200000, which is challenging. A diffraction grating may require a large area to achieve that kind of resolving power. However, an array waveguide grating (AWG) provides similar results to a diffraction grating in operation but uses guided optics rather than free space. Commercial, off the shelf (COTS) AWG can currently provide resolution of 25 GHz, while more advanced AWG can achieve ~3 GHz resolution. Thus, the hyperspectral radiometer may simultaneously determine power of the frequency components of the received RF signal with a resolution of 25 GHz or less per detected frequency, such as with a resolution of less than 3 GHz, such as 1 to 3 GHz or even finer (e.g., below 0.1 GHz for some applications), depending on the limits of the AWG.

Figure 3:
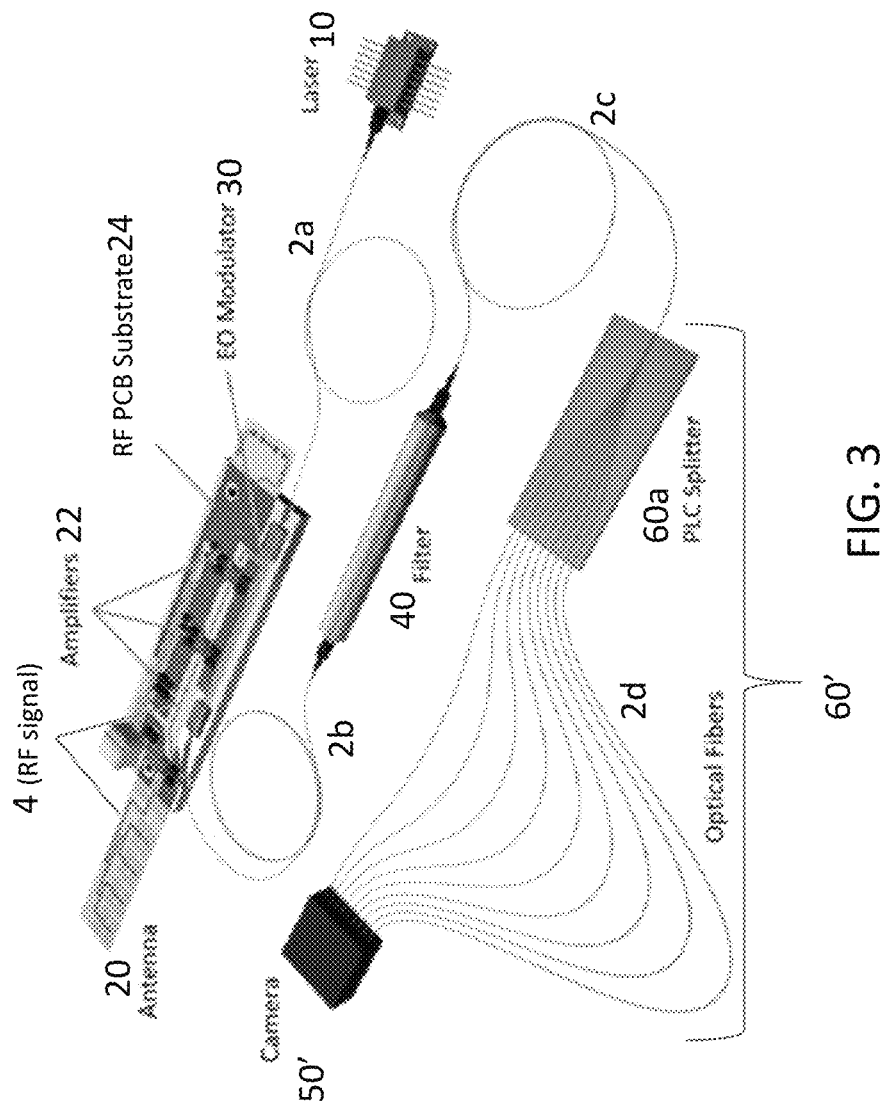
FIG. 3 is a block diagram of an exemplary implementation of the hyperspectral radiometer of FIG. 2.

FIG. 3 illustrates details of one example implementation of the hyperspectral radiometer of FIG. 2 using optical fibers 2d to form the AWG grating. Dispersion element 60' is formed as an array waveguide grating (AWG) including optical splitter 60a and a plurality of optical fibers 2d of different lengths. Optical splitter 60a receives the optical sideband from filter 40 via optical fiber 2c and splits the optical sideband m-ways into a plurality of channels, which are then fed to corresponding ones of m optical fibers 2d. As shown in FIG. 3, each of the optical fibers 2d may have different length from each of the other optical fibers 2d. For example, the optical fibers may substantially correspond to the optical path length from the input of the optical splitter 60a to the input into camera 50'. For m channels, the optical path length of the channels may increment channel by channel by the same amount. For example, for m channels, the optical path length of the ith channel (where i is a number between 1 and m) may be $x+\Delta i$ where x is a constant and $\Delta$ is a fixed increment. The outputs of the optical fibers 2d may be arranged regularly spaced apart (e.g., linearly spaced apart at a fixed pitch). As shown in FIG. 3, the optical fibers 2d may be arranged (at their outputs) in a physical order corresponding to a numerical order of their lengths (and corresponding to the optical path lengths of the corresponding optical channels that they form). In other examples, the outputs of the optical fibers 2d may be spaced apart at irregular spacings.

Figure 4:
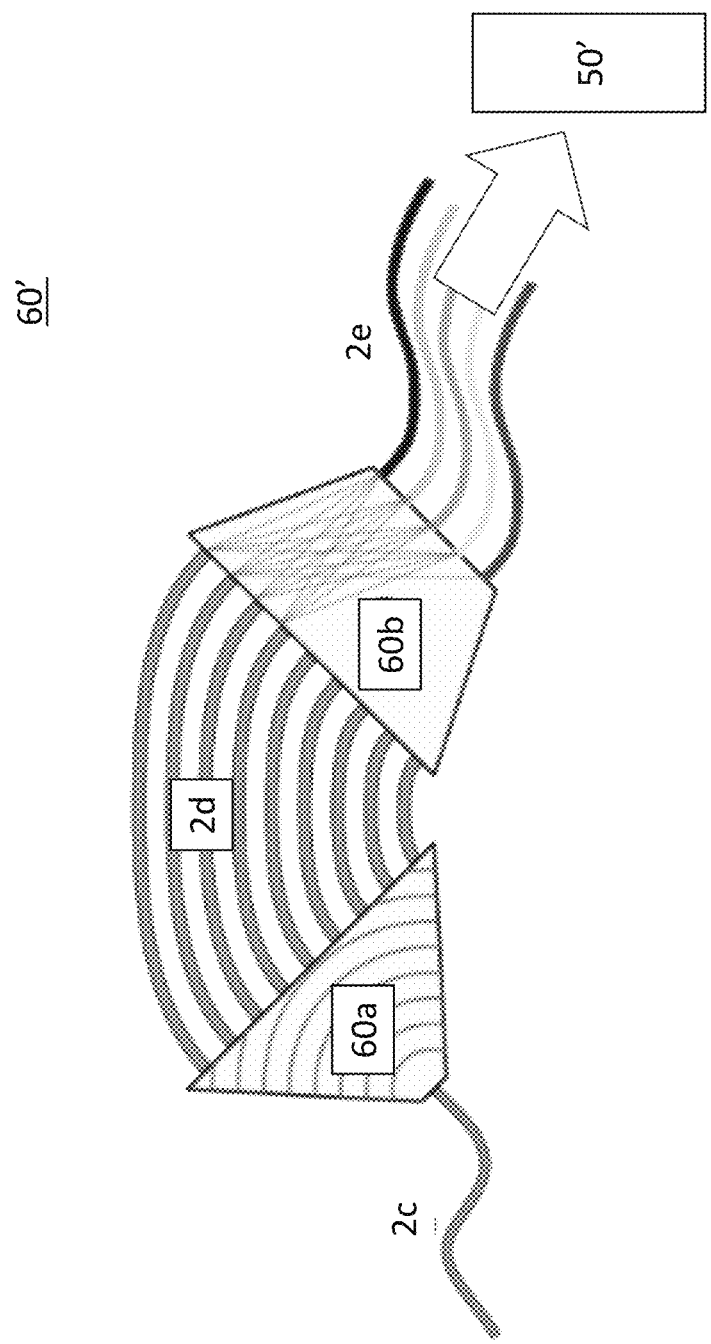
FIG. 4 shows details of an exemplary implementation of the AWG dispersion element 60' of FIG. 3.

FIG. 4 shows details of an exemplary implementation of the AWG dispersion element 60' of FIG. 3 (repetitive descriptions of the elements shown therein may be omitted). As will be appreciated, by providing different optical path lengths between the end of optical fiber 2c (corresponding to the input of the splitter 60a), the optical fibers 2d provide the m portions of the optical sideband with different time delays (e.g., at a fixed increment between the $1^{st}$ to mth optical channels formed in part by the m optical fibers 2d). Thus, phase differences may thus be provided by the m optical channels for the frequency components of the optical sideband. It will be appreciated that phase differences provided at the output of the m optical fibers 2d (corresponding to the end of the m optical channels) are dependent on frequency/wavelengths of the frequency components of the optical sidebands. As such, each frequency component is provided with a different phase offset between each neighboring optical fiber and the coherent interference of each frequency component (in the transmissive/transparent medium 60b (free space, glass, etc.) at the output of the optical fibers 2d) thus acts to direct each frequency component in a different direction from other frequency components of the optical sideband, as shown in FIG. 4. Thus, the AWG acts to spatially separate the frequency components of the optical sideband. The spatially separated frequency components are then directed to detector 50'. FIG. 4 shows an example where each optical fiber of a set of optical fibers 2e separately transmits a corresponding frequency component to detector 50', however such additional structure may be avoided and the detector 50' (e.g., the surface of a conventional CMOS image sensor) may be provided at the output of medium 60b.

In order to eliminate environmental factors that induce phase variations, such as acoustic noise and thermal drift, the fiber channels should be phase locked formed by each optical fiber 2d. Phase modulators (not shown) may be inserted within each optical channel (e.g., at the beginning or end of each of the optical fibers 2d) to stabilize each channel.

As the sensed intensity of the frequency components of the optical sideband correspond to a corresponding power level of an RF frequency, they hyperspectral radiometer may simultaneously detect plural RF frequencies in real time. For example, using only 8 channels, the entire frequency range from 50-75 GHz may be detected with ~3 GHz spacing or less in resolution. Spectral resolution can be tailored by adjusting the fiber lengths in the AWG 60' to adjust the optical path lengths. If finer resolution is desired, operation could be limited to one side of the absorption edge (e.g., of the antenna), e.g., from 60-75 GHz, and/or additional channels may be provided.

Figure 5:
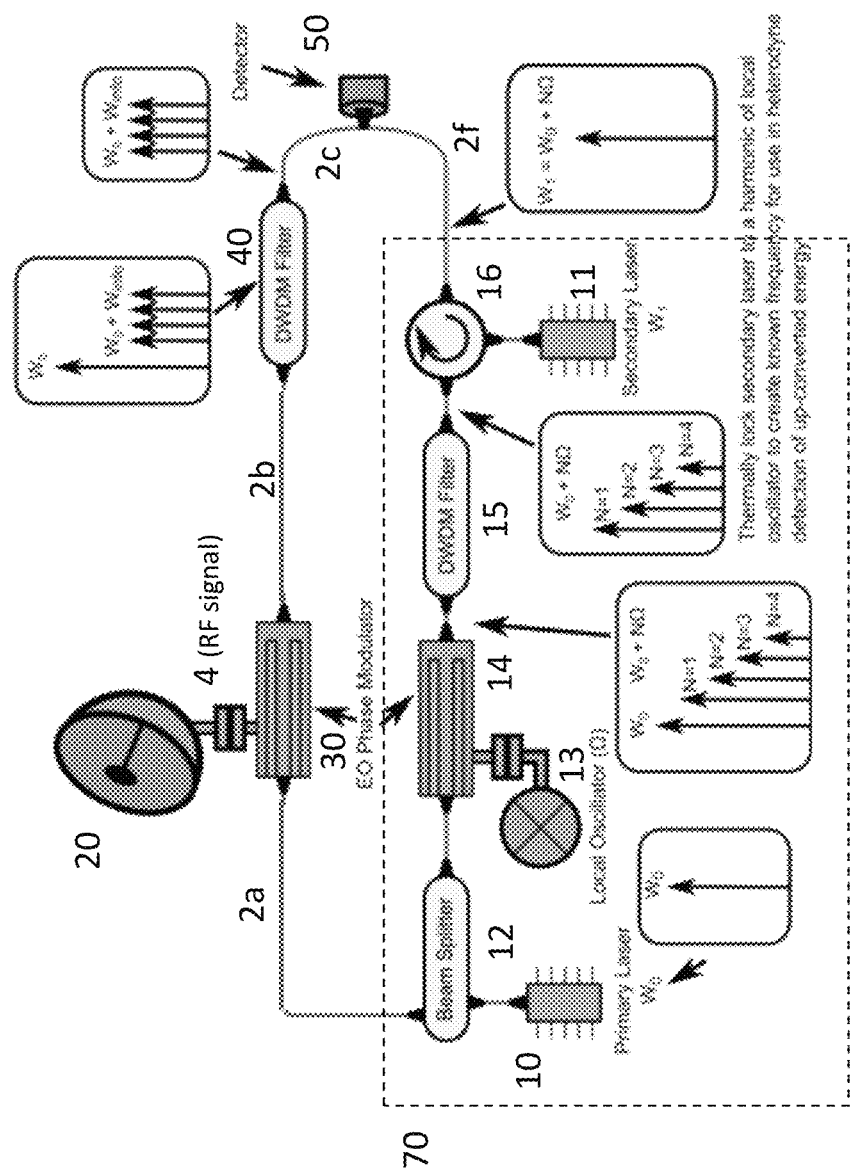
FIG. 5 illustrates another example of a hyperspectral radiometer according to embodiments.

FIG. 5 illustrates another example of a hyperspectral radiometer according to various embodiments. Use of same or similar reference numerals refer to same structure described elsewhere herein and repetitive description may be omitted. In the example illustrated in FIG. 5, the hyperspectral radiometer includes laser 10, antenna 20, EO modulator 30, filter 40, optical fibers 2a, 2b and 2c, and RF waveguide 4 connected and functioning as described with respect to FIGS. 1 and 2. As shown in FIG. 5, laser 10 is provided as a primary laser and generates the optical carrier which is then provided to the EO modulator 30 via optical fiber 2a for electro-optical modulation by the EO modulator 30 and RF signal (provided by RF waveguide 4). The modulated optical carrier, with optical sidebands corresponding to the RF signal, is thus provided to filter 40 which passes one of the sidebands to impinge on detector 50, as described herein.

The embodiment of FIG. 5 also provides a second laser 11 that provides an optical beam that operates at a frequency offset from the frequency of the first optical beam (the optical carrier described herein) generated by the primary laser 10. In the example of FIG. 5, primary laser 10 generates an optical carrier having a frequency of $W_0$ and secondary laser 11 generates a second optical beam having a frequency of $W_0$+an offset (NΩ). The second optical beam is combined with the optical sideband output by the filter 40 and also impinges on detector 50 (as a combined optical beam, combined with the optical sideband).

Figure 7:
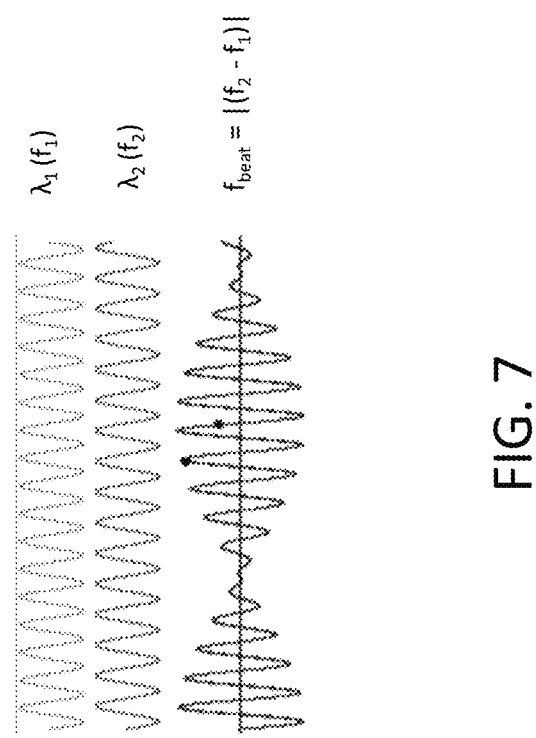
FIG. 7 is an illustration to help explain generation of a beat frequency.

Once the RF signal from antenna 20 has been upconverted to optical sidebands using the EO modulator 30 (fed by the RF signal from antenna 20 and the optical carrier from laser 10), one of those sidebands (output by filter 40) is combined with the optical beam from the second laser 11 that is offset in frequency from the first laser by the desired receiver detection frequency. The desired receiver detection frequency may be selected and modified. When two optical signals of different frequencies are coherently combined, the optical signals constructively and destructively interfere with one another to create a combined optical signal having a beat frequency corresponding to the difference in frequencies of the combined optical signals. FIG. 7 is provided to explain the concept of a beat frequency, showing the upper two signals having a wavelength (frequency) of $\lambda_1$ ($f_1$) and $\lambda_2$ ($f_2$), respectively, that, when combined (lower signal) provide a signal provides a beat frequency of $f_{beat}$ (equal to the difference of $f_1$ and $f_2$). The beat frequency is the frequency of the oscillation of the envelope of the combined signal.

When a combined optical signal having such a beat frequency is irradiated on the photodetector 50, the photodetector 50 generates an electrical signal at the beat frequency. In this example, each component frequency of the optical sideband provided by filter 40 on optical waveguide 2c is combined with the secondary optical beam from laser 11 resulting in a beat frequency for that component frequency (which are all combined together at the photodetector) that may be extracted as a corresponding frequency component of the electrical signal by the photodetector 50. Thus, together with the photodetector 50, the secondary optical beam provided by laser 11 acts to downconvert each of the frequency components of the optical sideband provided by filter 40 by a frequency equal to the frequency of the secondary optical beam. The resulting multi-frequency electrical signal generated by photodetector 50 thus contains frequency components representing the frequency components of RF signal obtained by antenna 20 (as provided by the optical side band output by filter 40).

The difference in the frequencies of the primary optical beam (from laser 10) and the secondary optical beam from laser 11 may be set by tuning the second laser 11. Specifically, the frequency of the second laser 11 may be selected to correspond to the desired detection frequency. The first laser 12 may provide an optical beam that is fixed in frequency to align the desired sideband to pass through the filter 40 while suppressing the optical carrier frequency (corresponding to the frequency of laser 10), which might otherwise saturate the receiver back-end. When the second laser 11 is aligned in frequency with the optical sideband, the sideband signal is converted to an intermediate frequency signal via the photodetector 50.

The optical heterodyne (mixing of two optical beams of close frequency) downconversion in this case produces beat signals for all frequencies passed through the filter 40. For example, if the offset between the two optical beams of the lasers 10 and 11 is 100 GHz, and the RF signal received by the antenna 20 is between 90 and 120 GHz, then the electrical signal generated by the photodiode 50 may contain signal components at all the different RF frequencies of the signal received by the antenna 20. In this example, the RF signal received by the antenna 20 in the RF frequency spectrum of 90 to 120 GHz (represented by the optical sideband from filter 40) may be downconverted by the optical carrier frequency plus an additional 100 GHz to provide corresponding RF electrical signal components within the frequency range of −10 to 20 GHz (where the negative frequencies is folded back around DC to be confounded with the signal from 100 to 110 GHz). By placing an RF filter to the RF signal output by the photodetector 50, further resolution is possible.

Figure 8:
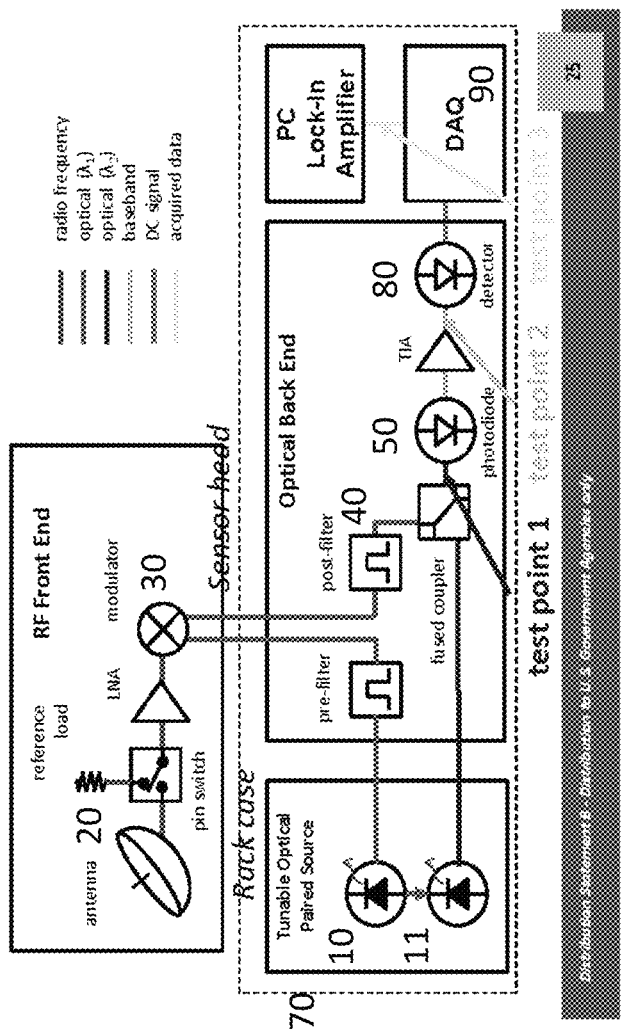
FIG. 8 provides exemplary details of post processing the downconverted signal provided by photodetector.

For example, referring to FIG. 8, a low pass filter (not shown in FIG. 5) of 100 MHz may be provided after the photodetector 50 (e.g., just before RF detector 80) and may thus select a very narrow frequency range (e.g., of 200 MHz) of the received RF frequency (i.e., centered around 100 GHz in this example) whose power may then be detected with the RF detector 80. The magnitude of a D.C. voltage output by this RF detector 80 may correspond to this selected narrow frequency range of the received RF signal and be captured and digitized by analog to digital converter 90. The optical processing here thus allows use of simple electronics designed to operate at DC-100 MHz to easily provide high spectral resolution using electronic components that are cheap and readily available. By modifying the frequency of the optical beam of the second laser 11, a different narrow frequency range of the of the received RF signal may be selected and analyzed (e.g., such as determining its power). The frequency of the optical beam of the second laser 11 may thus be repetitively modified in this fashion to analyze very narrow frequency ranges of the received RF signal, providing a broadband operation of the hyperspectral radiometer over hundreds of gigahertz, only limited by the tuning of the second laser.

The operation thus described has moved a millimeter wave RF signal at (30-300) gigahertz frequencies to optical (200 terahertz) frequencies using an electro-optic modulator, and then to microwave/radio wave frequencies (10-1000 megahertz), using optical heterodyne downconversion, the where it can conveniently be filtered and finally square law detected to extract the desired baseband signal. The resulting signal is proportional to the power in the millimeter wave spectrum at a particular frequency and spectral resolution, both of which are easily adjusted. By sweeping the frequency of the optical LO 13 and/or selecting different harmonics to lock the secondary laser 11, a set of measurements across large swaths of the electromagnetic spectrum can be generated, thus realizing a frequency agile, tunable, hyperspectral receiver.

The secondary laser 11 may run free of any synchronization with primary laser 10. However, the second laser 11 may also be locked to provide an optical beam with a frequency having a constant offset from the frequency of the optical beam of the primary laser 10 (an offset that is adjustable). In FIG. 5, this adjustable constant frequency offset is accomplished using a tunable optical paired source, or TOPS 70. As shown in FIG. 5, the optical beam from primary laser 10 is split by beam splitter with a portion provided to EO modulator 14 where it is modulated by an RF signal generated by local oscillator 13 to generate several harmonic frequencies (offset from the optical carrier frequency of the primary laser optical beam by an integer multiple of the RF frequency of the local oscillator 13). The optical carrier component of the modulated signal is then removed by filter 15 and provided to optical circulator 16. Secondary laser 11 is also fed to optical circulator 16 where it thermally locks on one of the harmonics resulting from the local oscillator to thus provide an optical beam of a known and selectable frequency offset from the optical carrier frequency of the primary laser 10. Selection of the frequency of the laser 11 may be performed during operational startup of the secondary laser by biasing temperature and/or by adjusting the RF frequency of the local oscillator 13. Such selection and tunability of the frequency of secondary laser 11 is described in U.S. Pat. No. 9,525,489, the contents of which are hereby incorporated by reference.

Figure 6:
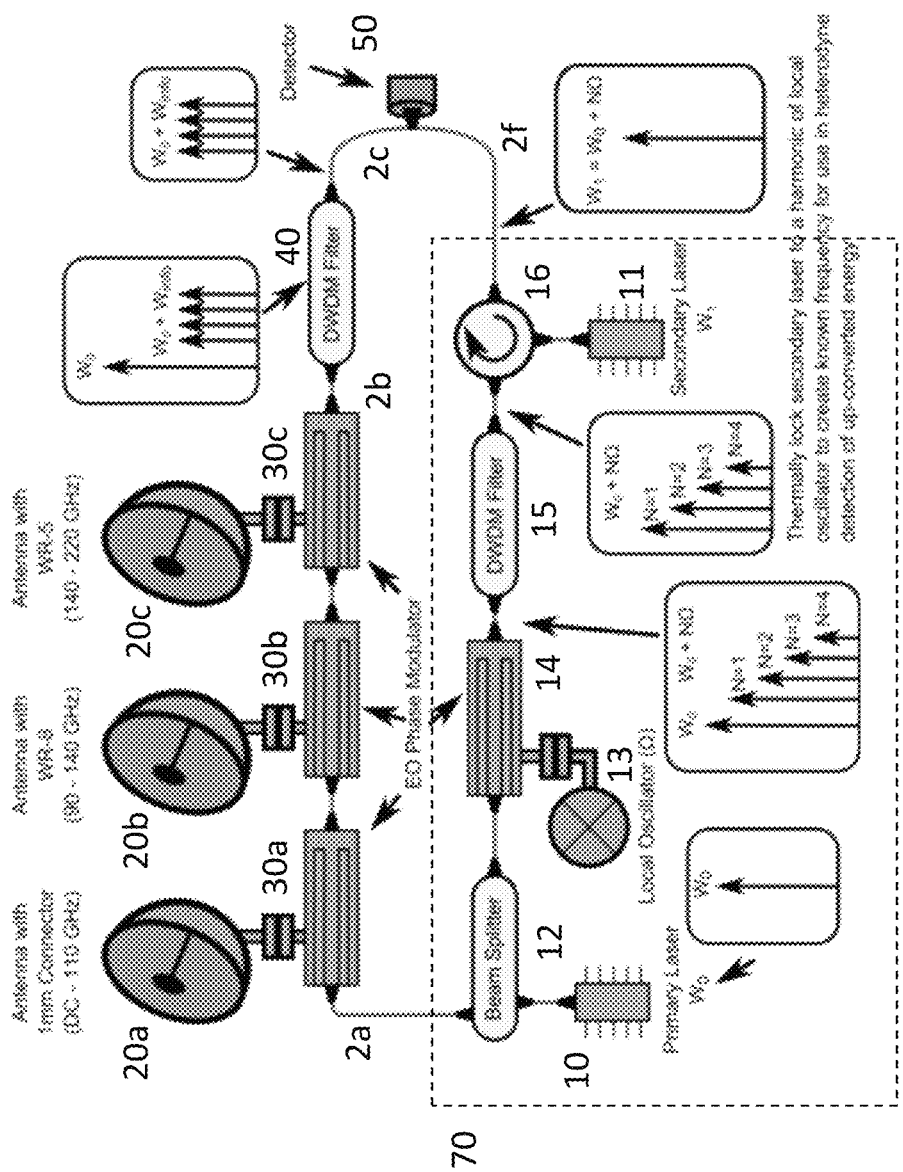
FIG. 6 shows a modification of the hyperspectral radiometer of FIG. 5 that may also be applied to the other disclosed embodiments.

FIG. 6 shows a modification of the hyperspectral radiometer of FIG. 5 that may also be applied to the other embodiments described herein (e.g., with respect to the embodiments of FIGS. 1, 2 and 3). As shown in FIG. 6, plural antennas 20a, 20b and 20c having different operational frequencies are used to obtain several RF signals that are respectively modulated by separate EO modulators 30a, 30b and 30c. In this example, the EO modulators 30a, 30b and 30c are cascaded together. "Downstream" EO modulators 20b and 20c modulate the outputs of the "upstream" EO modulators, 20a and 20b respectively. As these outputs contain an optical carrier component, the additional modulations of the downstream modulations are additive to the overall sideband signal to provide a sideband signal having power information of the RF frequency components of the RF signals captured by each of the different antennas 20a, 20b and 20c. Alternative to the cascading configuration of FIG. 6, plural EO modulators 30a, 30b and 30c may each receive a split component of the optical carrier (e.g., directly from an optical splitter receiving the optical carrier output by the primary laser 10). In this instance, the outputs by the plural EO modulators 30a, 30b and 30c may be combined by an optical combiner and provided to filter 40 via optical fiber 2b.

The foregoing is illustrative of exemplary embodiments and is not to be construed as limiting thereof. Although a few exemplary embodiments have been described, those skilled in the art will readily appreciate that many modifications are possible without materially departing from the novel teachings and advantages of the inventive concepts. For example, although various components and optical connections therebetween have been shown separately, it will be appreciated that such (some or all) components may be combined on a single chip as part of a PIC (photonic IC). For example, although the RF signal received by the antenna and processed by the radiometer has mostly been referenced as a microwave/millimeter wave RF signal, it will be appreciated that other portions of the electromagnetic spectrum (e.g., RF signals other than microwave/millimeter wave) and may be processed by the radiometer. It may be appreciated that the same backend optical processing of the radiometers described herein may be used with different spectrum by swapping out the antennas 20 to use antennas with different operational frequencies (different RF waveguides 4 may also need to be implemented in certain cases). Accordingly, all such modifications are intended to be included within the scope of the present invention as defined in the claims.

What is claimed is:

1. A method of RF signal processing comprising:
   receiving an RF signal at an antenna;
   modulating the received RF signal onto an optical carrier to generate a modulated signal having at least a first sideband;
   filtering the modulated signal to pass the first sideband to a photodetector;
   spatially dispersing the passed first sideband to provide a plurality of spatially separate optical components to the photodetector, the plurality of spatially separate optical components having different frequencies; and
   extracting information of the RF signal received by the antenna from an electrical signal generated by the photodetector,
   wherein spatially dispersing the passed first sideband comprises:
      splitting the passed first sideband m-ways to generate m portions of the first sideband;
      transmitting the m portions of the first sideband respectively with m optical fibers into a transmissive medium, the m optical fibers having different optical path lengths; and
      spatially separating the optical components by coherent interference within the transmissive medium of respective frequency components of the m portions of the first sideband, and
   wherein m is an integer greater than or equal to 2.

2. The method of claim 1, wherein the photodetector comprises an array of photodiodes and the method further comprises the photodetector simultaneously detecting information of each of the plurality of spatially separate optical components of different frequencies.

3. The method of claim 2, wherein the method further comprises the photodetector simultaneously detecting power information of each of the plurality of spatially separate optical components of different frequencies.

4. The method of claim 3, wherein the method comprises the photodetector simultaneously detecting power information of each of the plurality of spatially separate optical components of different frequencies in real time.

5. The method of claim 1, wherein spatially dispersing the passed first sideband comprises using an arrayed waveguide grating to spatially separate the plurality of optical components of the passed first sideband.

6. The method of claim 1,
wherein filtering the modulated signal comprises filtering the modulated signal with a passband filter.

7. The method of claim 6, further comprising tuning the passband filter to select a frequency band to be measured by the photodetector.

8. The method of claim 6, wherein the passband filter is a dense wavelength divisional multiplexing (DWDM) filter.

9. The method of claim 1, further comprising extracting both millimeter and microwave frequency information from the electrical signal generated by the photodetector.

10. The method of claim 1,
wherein the steps of claim 2 are performed to operate a radiometer having spectral coverage in both millimeter and microwave frequencies.

11. The method of claim 10, wherein the radiometer has a spectral coverage of at least 20 GHz to 300 GHz.

12. The method of claim 10, wherein the radiometer is formed as a spectrograph.

13. A method of RF signal processing comprising:
receiving an RF signal at an antenna;
modulating the received RF signal onto an optical carrier to generate a modulated signal having at least a first sideband;
filtering the modulated signal to pass the first sideband to a photodetector;
spatially dispersing the passed first sideband to provide a plurality of spatially separate optical components to the photodetector, the plurality of spatially separate optical components having different frequencies; and
extracting information of the RF signal received by the antenna from an electrical signal generated by the photodetector,
wherein the RF signal comprises an atmospheric transmission of plural RF frequencies,
wherein receiving the RF signal comprises passive sensing of the RF signal to obtain atmospheric condition data, and
wherein the atmospheric condition data comprises at least one of atmospheric temperature data and atmospheric moisture data.

14. A method of RF signal processing comprising:
receiving an RF signal at an antenna;
modulating the received RF signal onto an optical carrier to generate a modulated signal having at least a first sideband;
filtering the modulated signal to pass the first sideband to a photodetector;
spatially dispersing the passed first sideband to provide a plurality of spatially separate optical components to the photodetector, the plurality of spatially separate optical components having different frequencies; and
extracting information of the RF signal received by the antenna from an electrical signal generated by the photodetector,
wherein the RF signal comprises an atmospheric transmission of plural RF frequencies,
wherein receiving the RF signal comprises passive sensing of the RF signal to obtain atmospheric condition data, and
wherein receiving the RF signal comprises passive sensing of the RF signal to obtain data of at least one of precipitation rate, land surface emissivity, snow cover, sea ice concentration, land surface temperature and cloud liquid water.

15. The method of claim 1, wherein modulating the received RF signal comprising preserving both amplitude and phase of the RF signal in the first sideband.

16. The method of claim 1, wherein the photodetector comprises an array of photodetectors.

17. A method of RF signal processing comprising:
receiving an RF signal at an antenna;
modulating the received RF signal onto an optical carrier to generate a modulated signal having at least a first sideband;
filtering the modulated signal to pass the first sideband to a photodetector;
spatially dispersing the passed first sideband to provide a plurality of spatially separate optical components to the photodetector, the plurality of spatially separate optical components having different frequencies; and
extracting information of the RF signal received by the antenna from an electrical signal generated by the photodetector,
wherein the method comprises the photodetector simultaneously and separately detecting the spatially separate optical components having different frequencies, and
wherein the spatially separate optical components have a spacing of 3 GHz or less in resolution.

18. A method of operating a radiometer to sense atmospheric conditions by sensing frequency components of a passive atmospheric RF signal transmitted via the atmosphere, the method comprising:
passively sensing the passive atmospheric RF signal transmitted via the atmosphere, the passive atmospheric RF signal comprising plural RF frequency components;
modulating the passive atmospheric RF signal onto an optical carrier to generate a modulated signal having at least a first sideband;
filtering the modulated signal to pass the first sideband;
spatially dispersing the passed first sideband to provide a plurality of spatially separate optical components to a photodetector; and
by the photodetector, simultaneously detecting information of each of the plurality of spatially separate optical components of different frequencies to simultaneously extract atmospheric condition data corresponding to each of the plural RF frequency components of the passive atmospheric RF signal.

19. The method of claim 18, wherein radiometer acts as a power meter to simultaneously determine power of each of the plural RF frequency components of the passive atmospheric RF signal.

20. The method of claim 19, wherein the spatially separate optical components have a spacing of 3 GHz or less in resolution.

21. The method of claim 18, wherein the atmospheric condition data comprises at least one of atmospheric temperature data and atmospheric moisture data.

22. The method of claim 18, further comprising obtaining data from the photodetector of at least one of precipitation rate, land surface emissivity, snow cover, sea ice concentration, land surface temperature and cloud liquid water.

23. A method of operating a radiometer to sense conditions of at least one of atmosphere, ground cover and an ocean surface by sensing frequency components of a passive RF signal transmitted via the atmosphere, the method comprising:
  passively sensing the passive RF signal transmitted via the atmosphere, the RF signal comprising plural RF frequency components;
  modulating the passively sensed RF signal onto an optical carrier to generate a modulated signal having at least a first sideband;
  filtering the modulated signal to pass the first sideband;
  spatially dispersing the passed first sideband to provide a plurality of spatially separate optical components to a photodetector;
  by the photodetector, simultaneously detecting information of each of the plurality of spatially separate optical components of different frequencies to simultaneously extract condition data of at least one of the atmosphere, ground cover and the ocean surface corresponding to each of the plural RF frequency components of the passively sensed RF signal.

24. The method of claim 23, wherein radiometer acts as a power meter to simultaneously determine power of each of the plural RF frequency components of the passively sensed RF signal.

25. The method of claim 24, wherein the spatially separate optical components have a spacing of 3 GHz or less in resolution.

26. The method of claim 23, wherein the condition data comprises at least one of atmospheric temperature data and atmospheric moisture data.

27. The method of claim 23, wherein the condition data comprises at least one of precipitation rate, land surface emissivity, snow cover, sea ice concentration, land surface temperature and cloud liquid water.

* * * * *